United States Patent
Eilerman et al.

(10) Patent No.: US 12,088,075 B2
(45) Date of Patent: Sep. 10, 2024

(54) QUICK ACCESS COVER FOR CABLE TRAY

(71) Applicant: Eaton Intelligent Power Limited, Pembroke (IE)

(72) Inventors: Bret Eilerman, Highland, IL (US); Matthew Thomas Combes, Greenville, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 59 days.

(21) Appl. No.: 17/821,516

(22) Filed: Aug. 23, 2022

(65) Prior Publication Data
US 2023/0067243 A1 Mar. 2, 2023

Related U.S. Application Data

(60) Provisional application No. 63/236,408, filed on Aug. 24, 2021.

(51) Int. Cl.
*H02G 3/04* (2006.01)

(52) U.S. Cl.
CPC ......... *H02G 3/0456* (2013.01); *H02G 3/0418* (2013.01)

(58) Field of Classification Search
CPC .. H02G 3/0456; H02G 3/0418; H02G 3/0437; H02G 3/105; H02G 3/128; H02G 3/263
See application file for complete search history.

(56) References Cited

U.S. PATENT DOCUMENTS

| | | |
|---|---|---|
| D203,337 S | 12/1965 | Gaither |
| D293,203 S | 12/1987 | Hertensteiner |
| D448,650 S | 10/2001 | Vrame |
| 7,459,632 B2 * | 12/2008 | Bowman .............. E04F 19/083 174/67 |
| 9,169,948 B2 | 10/2015 | Buttars |
| D799,941 S | 10/2017 | Rothenberg et al. |
| D892,599 S | 8/2020 | Witherbee |
| D923,584 S | 6/2021 | Schulz |
| D928,101 S | 8/2021 | Henry |
| D946,384 S | 3/2022 | Zhang |
| D978,656 S | 2/2023 | Bright et al. |
| D1,008,003 S | 12/2023 | Glickfield |
| D1,008,196 S | 12/2023 | Shell |
| 2009/0032651 A1 * | 2/2009 | Sayres ................. H02G 3/0418 248/68.1 |
| 2014/0360751 A1 * | 12/2014 | De Vis ................. H02G 3/0437 174/68.3 |
| 2019/0052071 A1 * | 2/2019 | Henry ..................... H02G 9/04 |

* cited by examiner

*Primary Examiner* — Amy J. Sterling
(74) *Attorney, Agent, or Firm* — Stinson LLP (57) ABSTRACT

The present disclosure is directed to a cover assembly for a cable tray having a cover and at least one panel. The cover for a cable tray has at least one access opening. The panel aligns with at least one access opening to allow access to the cable tray upon removal of the panel. The panel is selectively secured to the cover using fasteners placed through aligned cover fastener holes and panel fastener holes. The panel has a top edge, a bottom edge, and two side edges. The top edge of the panel comprises an upward facing lip. The bottom edge of the panel includes a tongue that has a first portion and a second portion. The first portion is generally directed in a downward angle, and the second portion is generally directed in an upward angle.

20 Claims, 11 Drawing Sheets

QUICK ACCESS COVER FOR CABLE TRAY

CROSS-REFERENCE TO RELATED APPLICATIONS

This application claims the benefit of U.S. Provisional Patent Application Ser. No. 63/236,408, filed on Aug. 24, 2021, the entire contents are hereby incorporated by reference.

FIELD OF THE DISCLOSURE

The present disclosure is directed to a cover for a cable tray having at least one panel to allow access to the cable tray.

BRIEF SUMMARY

An aspect of the present disclosure provides a cover assembly for a cable tray. The cover assembly includes a generally planar cover that defines at least one access opening and is sized and shaped to close a top portion of a cable tray assembly. The cover assembly includes at least one panel coupled to the cover and disposed over the access opening of the cover. The at least one panel generally corresponds in size and shape to the at least one opening. The at least one panel is configured to be selectively movable relative to the cover away from the access opening to allow access to the cable tray through the access opening.

Another aspect of the present disclosure provides a cover assembly for a cable tray. The cover assembly includes a generally planar cover that is sized and shaped to close a top portion of a cable tray assembly. The cover defines at least one access opening in a central portion thereof. The cover assembly includes at least one panel having a top edge, a bottom edge, and two side edges. The panel generally corresponds in size and shape to the at least one opening. The panel is coupled to the cover on at least one edge thereof over the cover opening. The top edge of the panel comprises an upward facing lip. The bottom edge of the panel includes a tongue that has a first portion and a second portion. The first portion is generally directed in a downward angle, and the second portion is generally directed in an upward angle.

In yet another aspect, the present disclosure provides a cable tray assembly that includes a generally planar cover and at least one panel. The cover is sized and shaped to close a top portion of a cable tray assembly, and the cover defines at least one access opening and a plurality of fastener holes. The at least one panel is coupled to the cover and disposed over the access opening of the cover. A plurality of fastener holes is defined in the panel to correspond in location to the cover fastener holes. The at least one panel generally corresponds in size and shape to the at least one access opening. The at least one panel is configured to be selectively movable relative to the cover away from the access opening to allow access to the cable tray through the access opening, and the panel is selectively secured to the cover using fasteners placed through the cover fastener holes and the panel fastener holes.

BRIEF DESCRIPTION OF THE DRAWINGS

Corresponding reference characters indicate corresponding parts throughout the drawings.

DETAILED DESCRIPTION

When maintenance is required on an electrical system or a new circuit needs to be run into the existing cable tray grid, many times, large components of the cable tray systems must be removed and lowered to ground level to gain access to the system. Standard covers can be up to 144 inches long and 36 inches wide. Small removable panels, such as those disclosed herein, allow ease of entry for cables and are small enough to temporarily store in the cage of a lift or fastened out of the way on top of the cover.

The present disclosure is directed to a cover for a cable tray allowing quick access to the cable tray. Turning now to FIGS. 1-4, an exemplary cable tray cover is indicated generally at reference numeral 10. Cover 10 can be removably mounted on cable tray rails 11 of the cable tray 13 to close or seal a portion of or substantially the entirety of the top opening of a cable tray assembly to prevent entry of debris or the like. As illustrated, the cover 10 is in the form of a generally flat plate 12. The cover 10 can define at least one fastener opening near an edge of the cover sized and shaped to receive a cover fastener 30 to secure the cover 10 to the top flange of the rail 11 of the cable tray 13.

The cover 10 further defines at least one panel opening 16 (e.g., an access opening) in a central portion 18 (i.e., non-edge portion) thereof. For example, the cover 10 can define two, three, four, or more panel openings 16. The cover 10 also defines at least one panel fastener opening 22 near an edge 24 of the at least one panel opening 16. For example, the cover can define at least one panel fastener opening 22 near a top edge 24*a* of the panel opening 16 and at least one panel fastener opening near a bottom edge 24*b* of the panel opening 16 to allow securement of a panel 28 to the cover 10.

Figure 1:
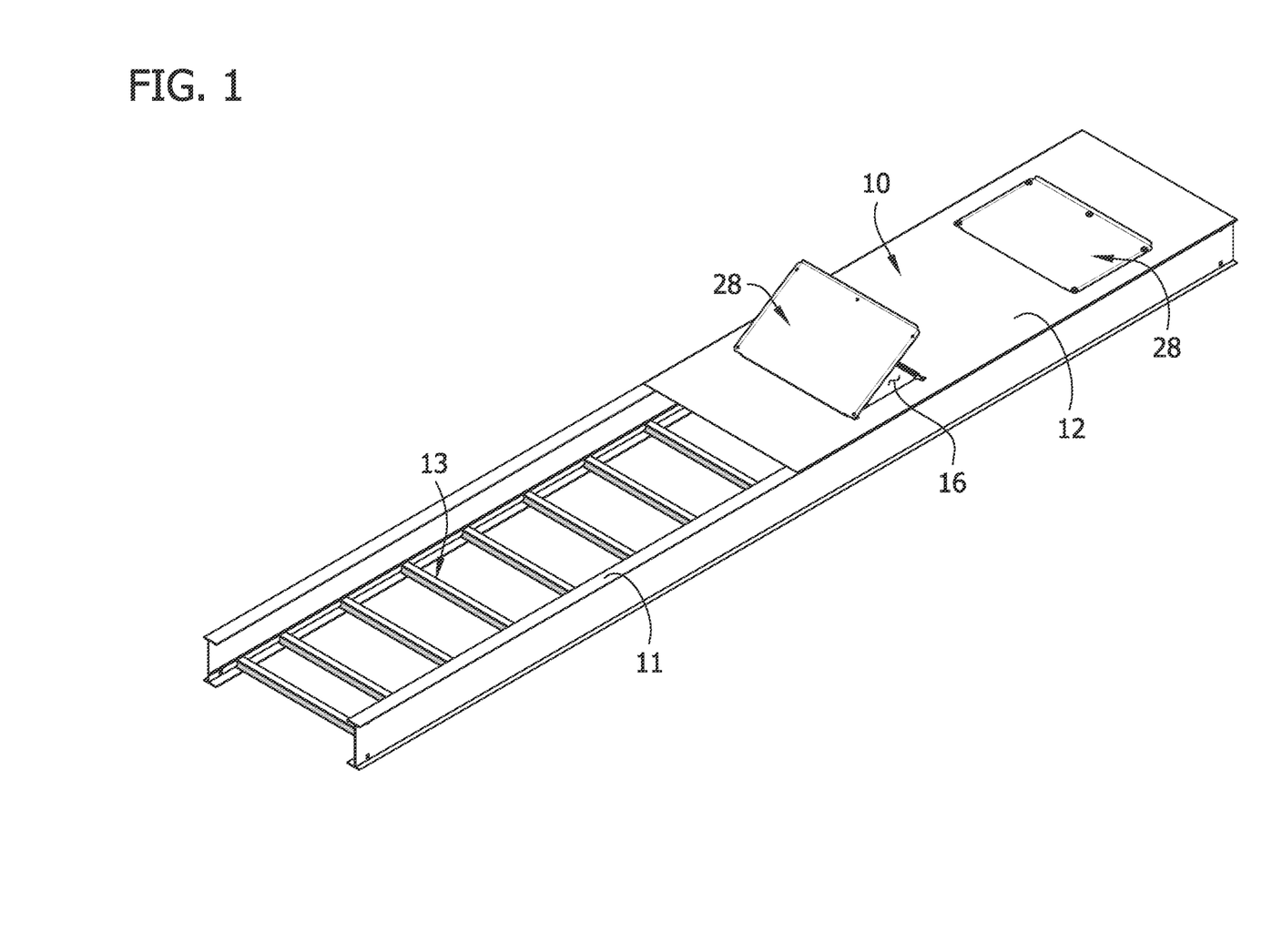
FIG. 1 is a perspective view of a cable tray cover mounted on cable tray rails according to one embodiment of the present disclosure.
Figure 2:
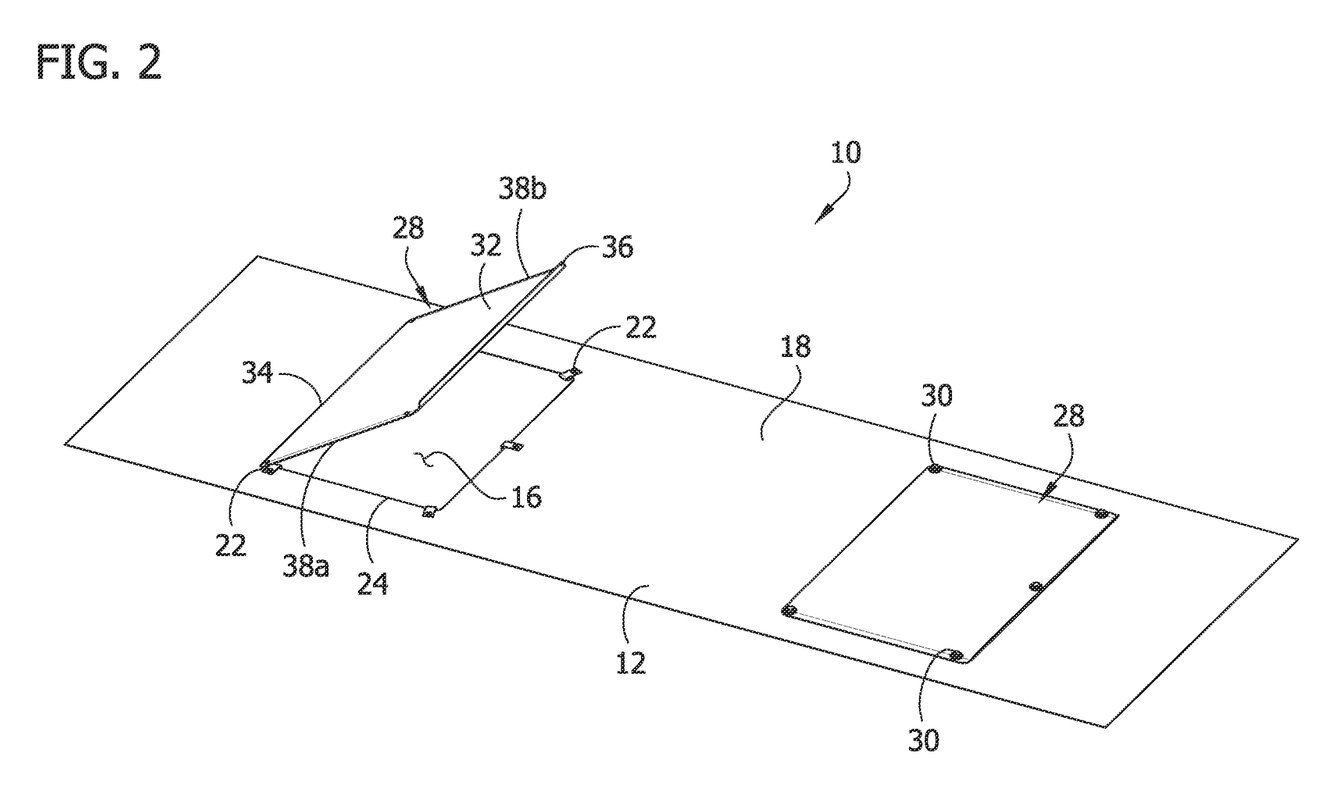
FIG. 2 is a perspective view of the cable tray cover of FIG. 1.
Figure 3:
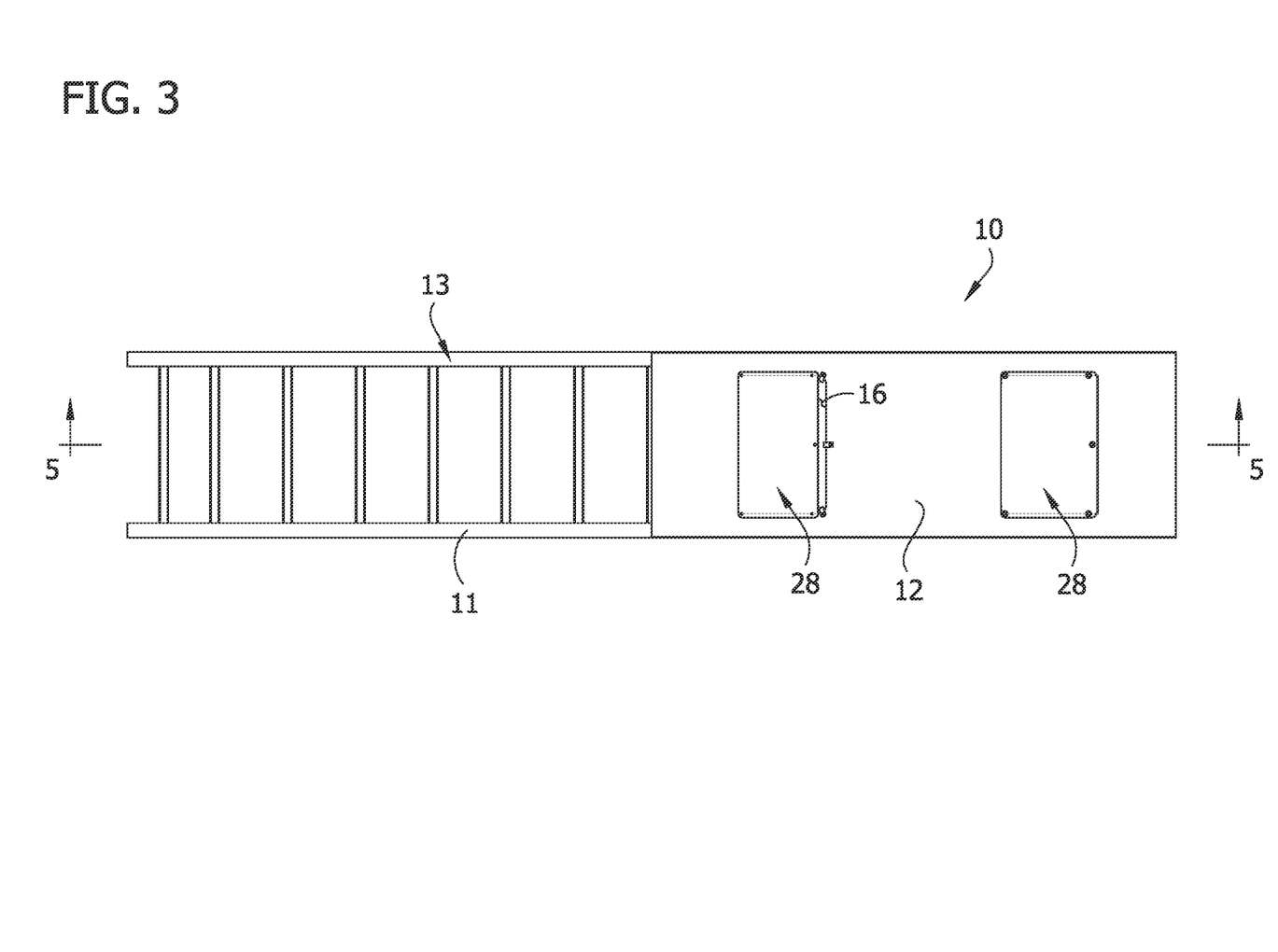
FIG. 3 is a top plan view of the cable tray cover mounted on cable tray rails of FIG. 1.
Figure 4:
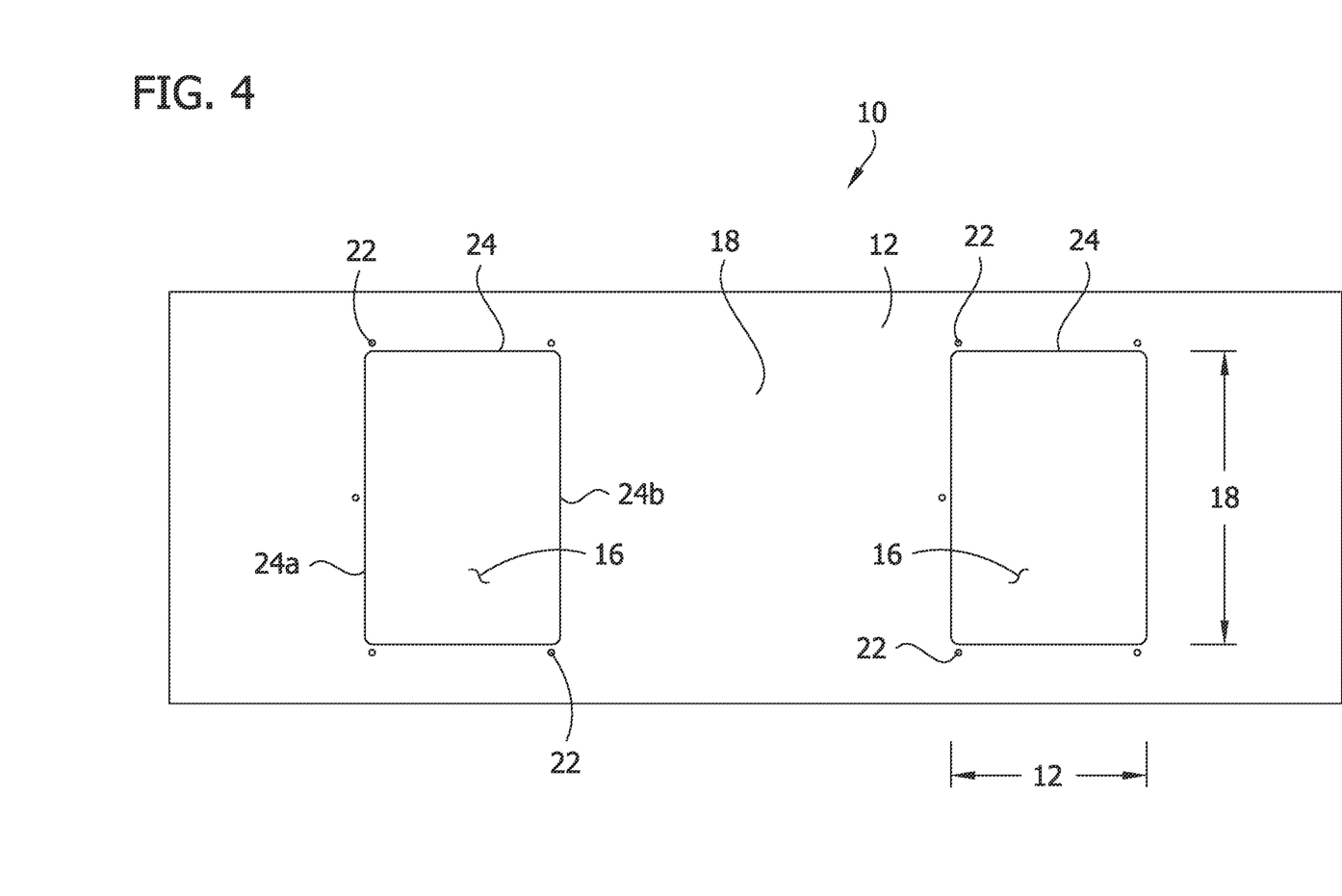
FIG. 4 is a top plan view of the cable tray cover of FIG. 2.
Figure 5:
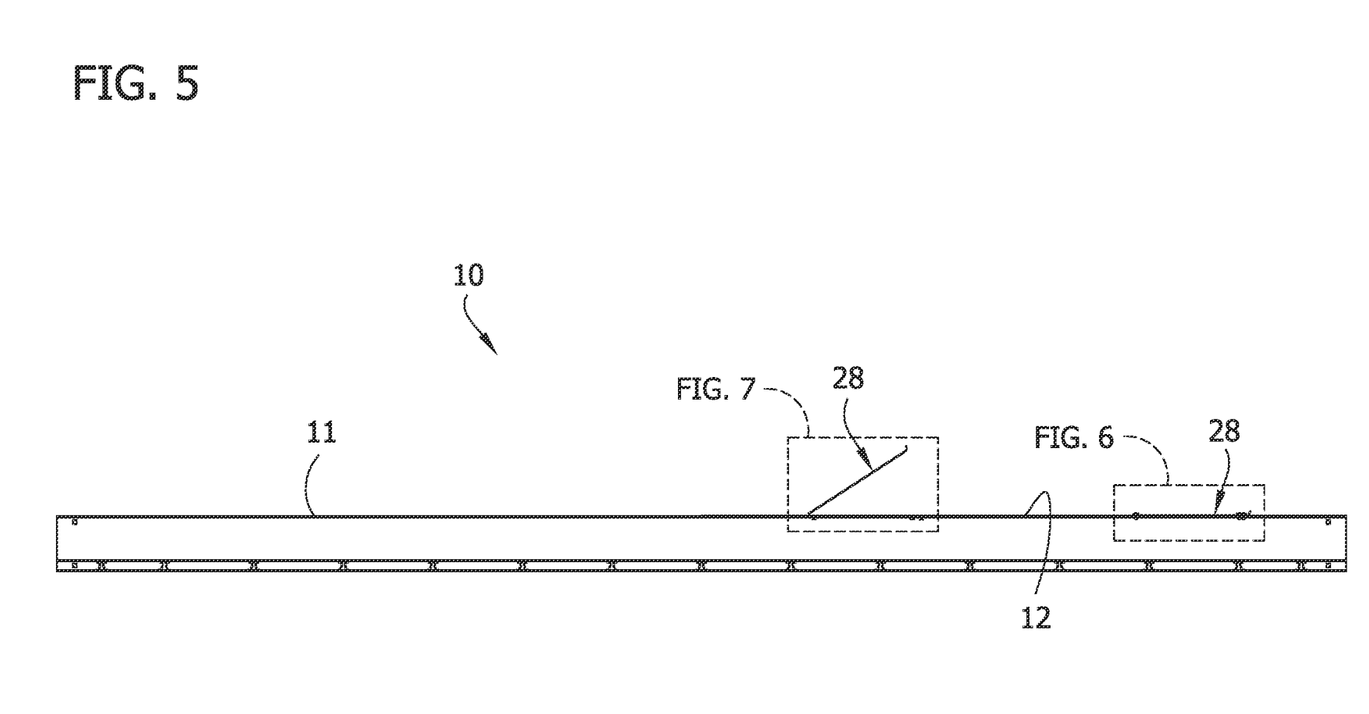
FIG. 5 is a cross section taken in the plane of line 5-5 of FIG. 3.
Figure 6:
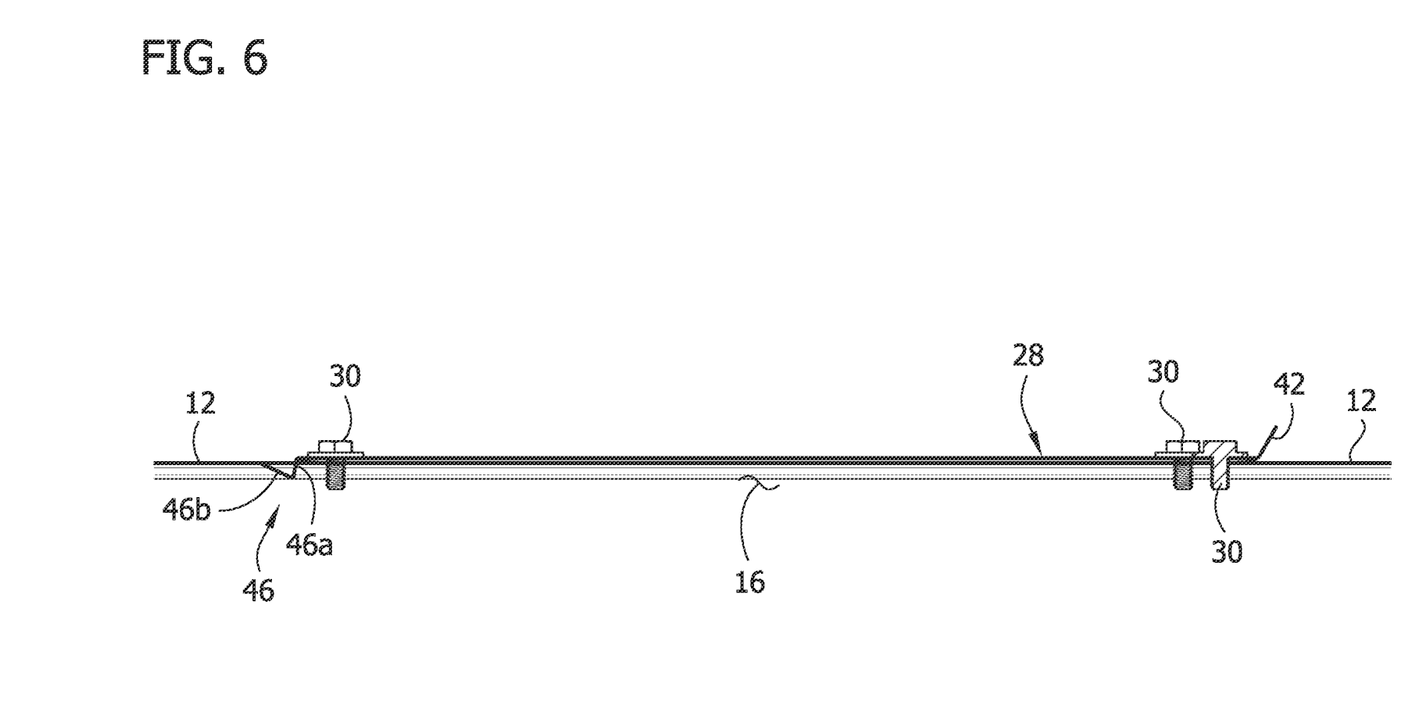
FIG. 6 is an enlarged, fragmentary cross section view of a panel of the cable tray cover in FIG. 5.
Figure 7:
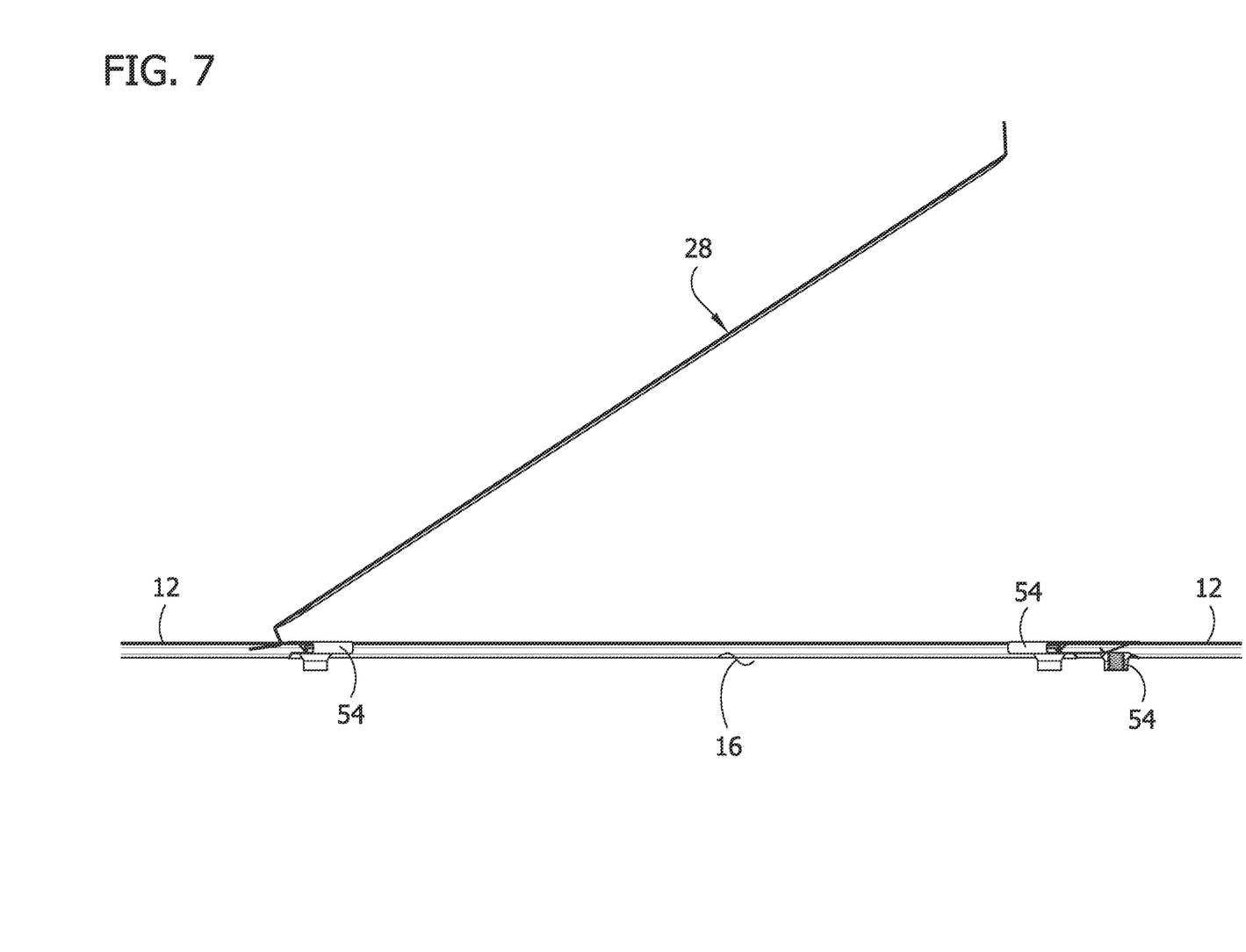
FIG. 7 is an enlarged, fragmentary cross section view of another panel of the cable tray cover in FIG. 5.
Figure 8:
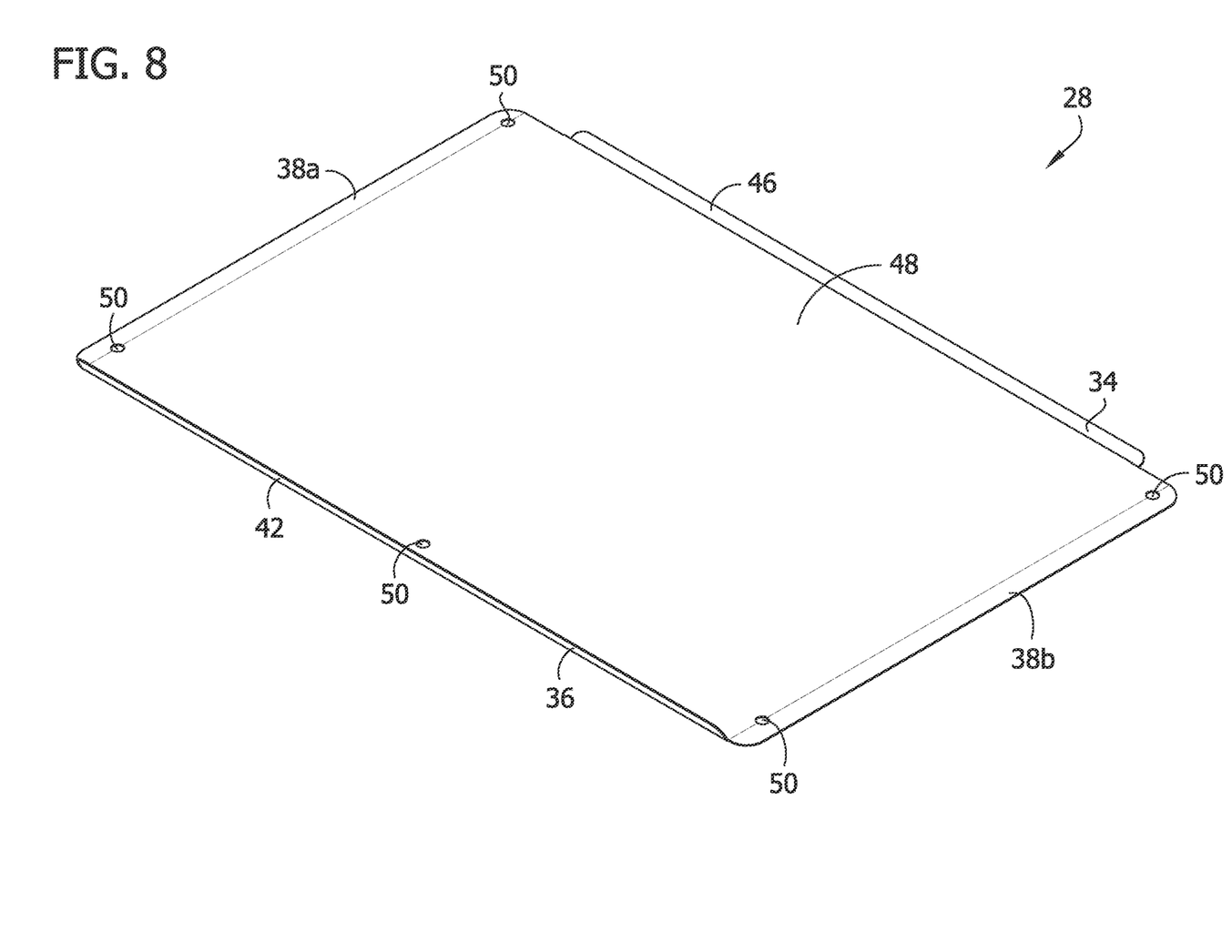
FIG. 8 is a perspective view of the removable panel of the cable tray cover of FIG. 1.
Figure 9:
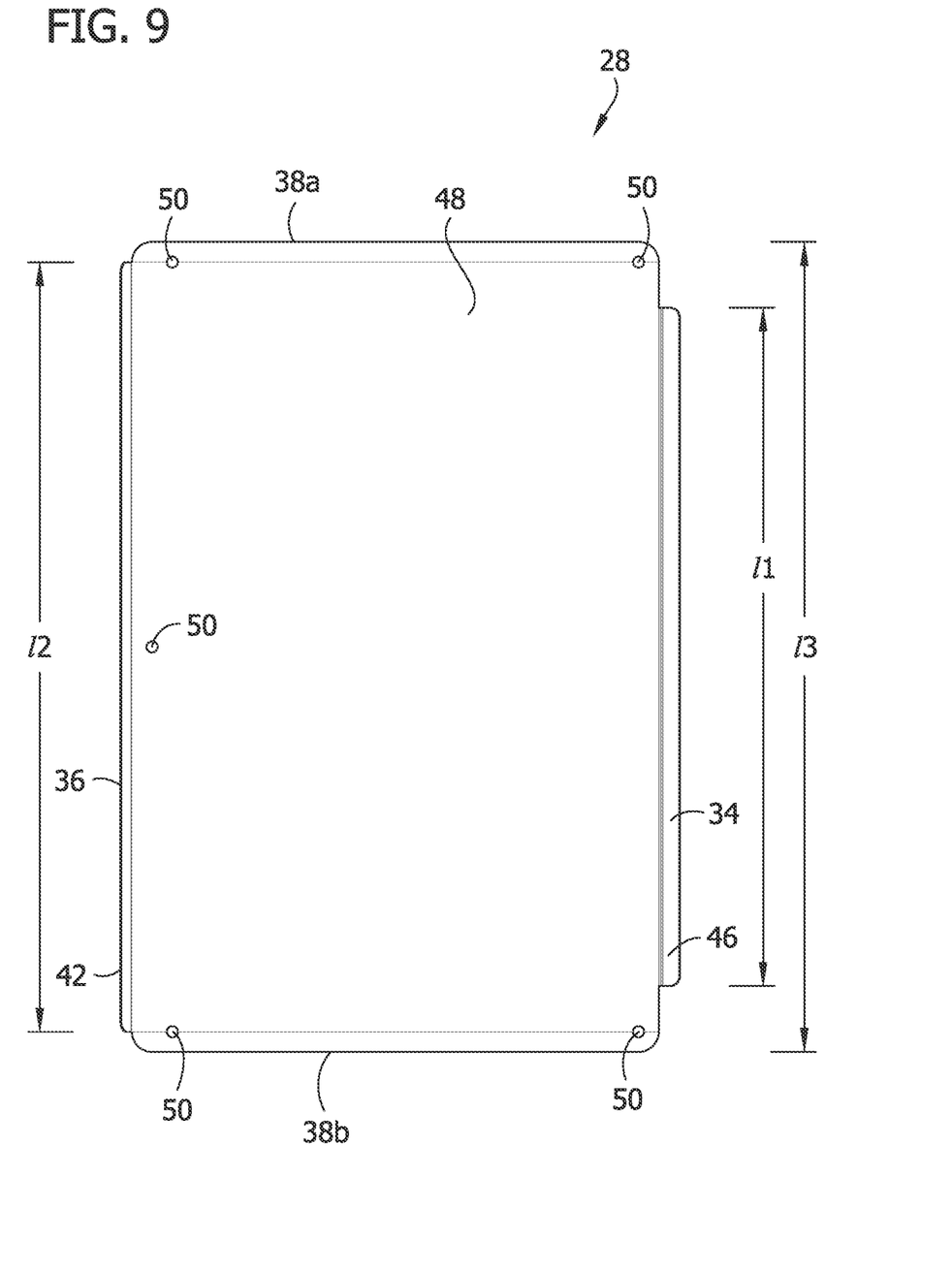
FIG. 9 is a top plan view of the removable panel of FIG. 3.
Figure 10:
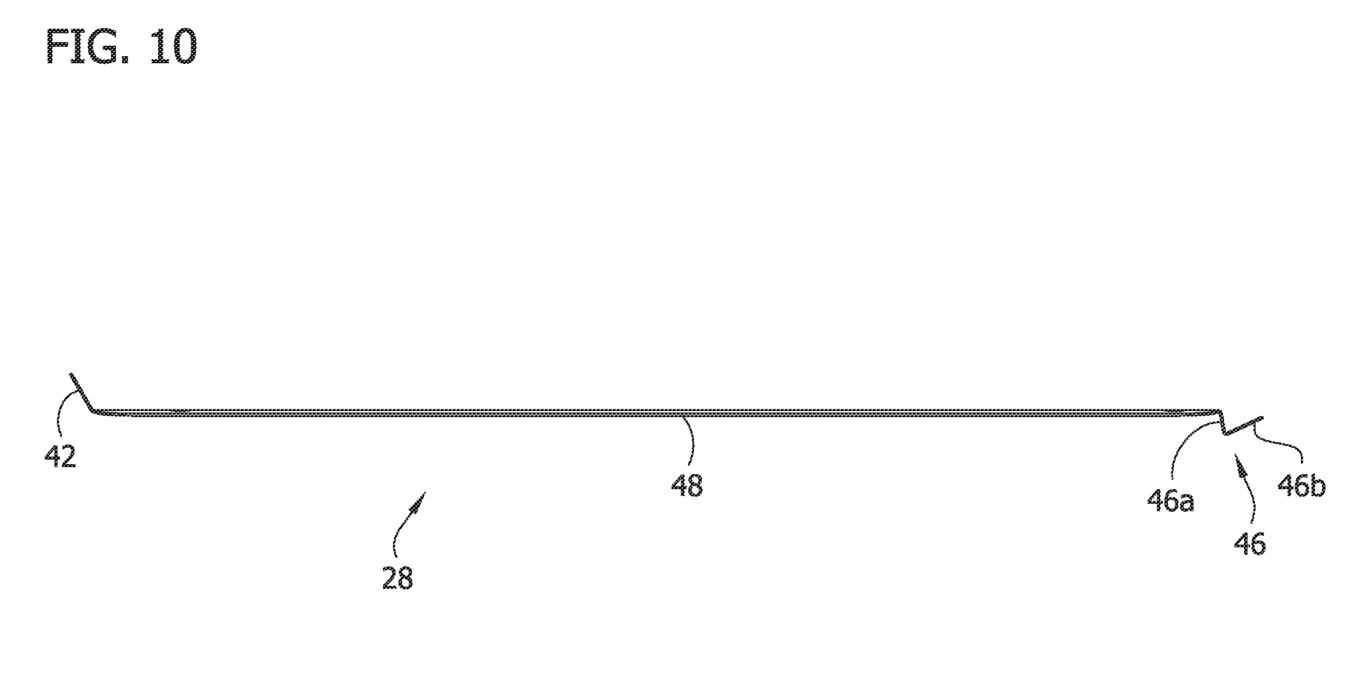
FIG. 10 is a side view of the removable panel of FIG. 3.

FIGS. 5-7 shows the cover 10 also comprising at least one panel 28. FIGS. 5-10 show the at least one panel 28 in the form of a generally flat plate 32 having a bottom edge 34, a top edge 36, and two side edges 38*a*, 38*b*. The top edge 36 of the panel 28 comprises a lip 42 (e.g., a bent portion of the panel 28 directed to a generally upward angle). The bottom edge 34 of the panel comprises a tongue portion 46. The tongue portion 46 generally includes a first portion 46*a* having a generally downward angle and a second portion 46*b* nearest the edge 34 of the panel 28 having a generally upward angle. In some aspects, the top edge 36 and the bottom edge 34 portions of the panel can have a reduced length 11 and 12, respectively, compared to the length 13 of a central portion 48 of the panel.

Figure 11:
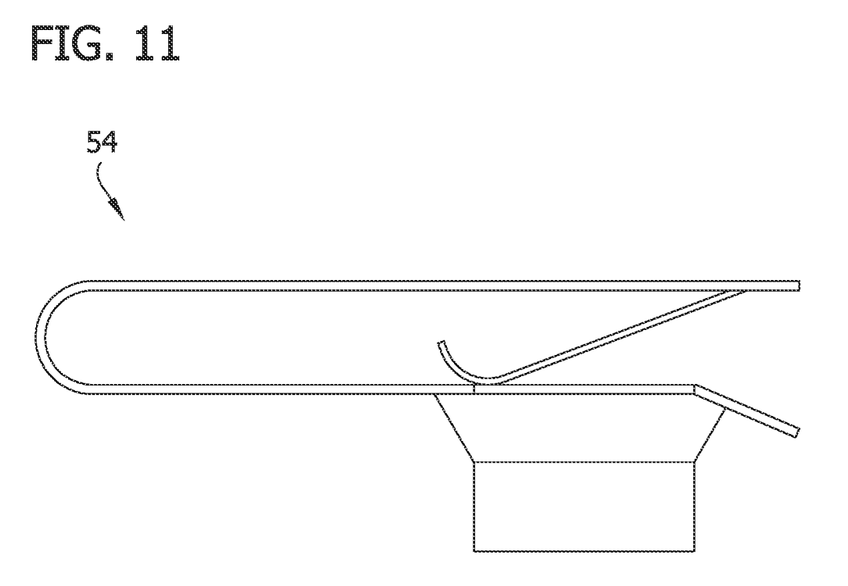
FIG. 11 is a side view of a clip nut that can be used, in conjunction with a bolt, as a fastener for the access panel on the cable tray covers described herein.

The panel 28 also defines at least one fastener opening 50 near an edge of the panel 28 that correlates with the at least one panel fastener opening 22 of the cover 10, such that when the panel 28 is placed over the panel opening 16 in the cover 10, the fastener openings 22 of the cover 10 and the fastener openings 50 of the panel 28 align. For example, the panel 28 can define at least one fastener opening 50 near the top edge 36 of the panel 28 and at least one fastener opening 50 near the bottom edge 34 of the panel 28 to allow securement of the panel 28 to the cover 10. A fastener 30 (e.g., bolt, or bolt with washer) can be placed within the aligned fastener openings 22, 50 of the cover 10 and the panel 28. In various aspects, and referring in particular to FIGS. 7 and 11, the fastener may also comprise a clip nut (sheet metal nut, U-nut) 54 defining a female threaded opening with which the male threads of the bolt engage.

In practice, the panel 28 is generally secured to the cover 10 over the panel opening 16 with fasteners 30. If the access is needed to the cable tray 13, instead of removing the entire cover 10, a user can access the cable tray 13 through removal of one panel 28. It is also possible to remove fasteners 30 along the top edge 36 of the panel 28 only and hinge the panel 28 upward to allow cable tray access without removing the entire panel 28. Once access is no longer needed, the panel 28 and fasteners 30 can be replaced onto the cover 10.

The cover and/or panel can be made of a metal or resiliently flexible material (e.g., aluminum alloy).

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A cover assembly for a cable tray comprising:
   a generally planar cover, sized and shaped to close a top portion of a cable tray assembly, wherein the cover defines at least one access opening and;
   at least one panel coupled to the cover and disposed over the access opening of the cover, wherein the at least one panel generally corresponds in size and shape to the at least one access opening, wherein the at least one panel is configured to be selectively movable relative to the cover away from the access opening to allow access to the cable tray through the access opening
   wherein the at least one panel is a generally flat plate having a top edge, a bottom edge, and two side edges, wherein the top edge of the panel comprises a lip, wherein the bottom edge comprises a tongue portion.

2. The cover assembly of claim 1, wherein the access opening is defined by a central portion of the cover.

3. The cover assembly of claim 1, wherein the cover defines at least one fastener holes configured to receive a fastener for coupling at least one panel to the cover.

4. The cover assembly of claim 3, wherein the fastener hole is near an edge of the at least one access opening.

5. The cover assembly of claim 1, wherein at least one panel defines a fastener hole, wherein panel covers the access opening of the cover when the fastener holes of the panel and the cover are aligned and secured with a fastener.

6. The cover assembly of claim 1, wherein the access opening and the panel are rectangular-shaped.

7. The cover assembly of claim 1, wherein the lip is defined by a bent portion of the panel directed to a generally upward angle.

8. The cover assembly of claim 1, wherein the tongue portion comprises a first portion having a generally downward angle and a second portion having a generally upward angle.

9. A cover assembly for a cable tray comprising:
   a generally planar cover, sized and shaped to close a top portion of a cable tray assembly, and defining at least one access opening in a central portion thereof;
   at least one panel having a top edge, a bottom edge, and two side edges, wherein the panel generally corresponds in size and shape to the at least one opening, and wherein the panel is coupled to the cover on at least one edge thereof over the cover opening;
   wherein the top edge of the panel comprises an upward facing lip; and
   wherein the bottom edge of the panel comprises a tongue having a first portion and a second portion, wherein the first portion is generally directed in a downward angle and wherein the second portion is generally directed in an upward angle.

10. The cover assembly of claim 9, wherein the cover defines at least one fastener hole and at least one panel defines at least one fastener hole configured to align with at least one fastener hole of the cover, wherein the fastener holes of the cover and the panel are configured to receive a fastener through aligned fastener holes.

11. The cover assembly of claim 10, wherein the fastener holes on the panel are on a planar portion of the panel.

12. The cover assembly of claim 9, wherein the fastener holes on the panel are on the two side edges of the panel and adjacent the top edge and bottom edge.

13. The cover assembly of claim 12, wherein a further fastener hole is between and aligned with the fastener holes on the side portion adjacent the top edge.

14. The cover assembly of claim 9, wherein the panel is coupled to the cover on at least one edge thereof over the access opening.

15. The cover assembly of claim 9, wherein the tongue of the bottom edge of the panel is configured to be received by the access opening.

16. The cover assembly of claim 15, wherein the tongue of the bottom edge clips the panel to the central portion of the cover.

17. The cover assembly of claim 9, wherein the lip of the top edge extends away from the access opening of the cover.

18. A cable tray assembly comprising:
   a cable tray including
      a pair of cable tray rails each having an upper portion and a lower portion, and
      a plurality of rungs secured to and extending between the lower portions of the cable tray rails;
   a generally planar cover secured to and extending between the upper portions of the pair of cable tray rails, wherein the cover defines at least one access opening disposed between the pair of cable tray rails; and at least one panel coupled to the cover and disposed over the at least one access opening of the cover, wherein the at least one panel generally corresponds in size and shape to the at least one access opening, wherein the at least one panel is configured to be selectively movable relative to the cover away from the at least one access opening to allow access to the cable tray through the at least one access opening.

19. The cable tray assembly of claim 18, wherein panel comprises a bottom edge defining a tongue configured to extend through the at least one access opening of the cover.

20. The cable tray assembly of claim 19, wherein the tongue has first portion and a second portion, wherein the first portion is generally directed in a downward angle through the at least one access opening, wherein the second portion is generally directed in an upward angle towards a portion of the cover.

\* \* \* \* \*